(12) United States Patent
Krob

(10) Patent No.: US 10,990,978 B2
(45) Date of Patent: Apr. 27, 2021

(54) METHOD OF TRANSACTION WITHOUT PHYSICAL SUPPORT OF A SECURITY IDENTIFIER AND WITHOUT TOKEN, SECURED BY THE STRUCTURAL DECOUPLING OF THE PERSONAL AND SERVICE IDENTIFIERS

(71) Applicant: A3BC IP, Paris (FR)

(72) Inventor: Daniel Krob, Paris (FR)

(73) Assignee: A3BC IP, Paris (FR)

( * ) Notice: Subject to any disclaimer, the term of this patent is extended or adjusted under 35 U.S.C. 154(b) by 743 days.

(21) Appl. No.: 15/553,728

(22) PCT Filed: Feb. 24, 2016

(86) PCT No.: PCT/FR2016/050423
§ 371 (c)(1),
(2) Date: Aug. 25, 2017

(87) PCT Pub. No.: WO2016/135419
PCT Pub. Date: Sep. 1, 2016

(65) Prior Publication Data
US 2020/0143382 A1    May 7, 2020

(30) Foreign Application Priority Data

Feb. 27, 2015    (FR) ..................................... 1551706

(51) Int. Cl.
*G06Q 20/40*      (2012.01)
*G06Q 20/20*      (2012.01)
(Continued)

(52) U.S. Cl.
CPC ..... *G06Q 20/40145* (2013.01); *G06Q 20/206* (2013.01); *G06Q 20/3829* (2013.01); *H04L 9/0866* (2013.01)

(58) Field of Classification Search
CPC .......... G06Q 20/40145; G06Q 20/206; G06Q 20/3829; H04L 9/0866
See application file for complete search history.

(56) References Cited

U.S. PATENT DOCUMENTS 5,764,789 A    6/1998    Pare, Jr. et al.
6,154,879 A    11/2000    Pare, Jr. et al.
(Continued)

FOREIGN PATENT DOCUMENTS

WO    WO-2001/027723 A1    4/2001
WO    WO-2006/0111205 A1    10/2006

OTHER PUBLICATIONS

Berkay Topcu, Practical security and privacy attacks against biometric hashing using sparse recovery, 2016, EURASIP Journal on Advances in Signal Processing (Year: 2016).*

(Continued)

*Primary Examiner* — Jacob C. Coppola
*Assistant Examiner* — Timothy Paul Sax
(74) *Attorney, Agent, or Firm* — Harness, Dickey & Pierce, PLC

(57) ABSTRACT

A method of a secure transaction without physical support of a security identifier and without a token includes recording on a biometric server a biometric profile linked intrinsically to a unique user, the profile being associated with at least one service identifier, recorded on a server distinct from the biometric server, the service identifier being accessible by the user, and during a transaction, acquiring the biometric profile of a user, in transmitting it to the biometric server for comparison with the biometric profiles recorded and in searching for a service associated with the profile and activating it on the service server. The step of recording a (Continued)

new user includes the time of receipt by a central server of a profile, the execution of a step of generating a temporary master random key.

2 Claims, 2 Drawing Sheets

(51) Int. Cl.
*G06Q 20/38* (2012.01)
*H04L 9/08* (2006.01)

(56) References Cited

U.S. PATENT DOCUMENTS

| | | | |
|---|---|---|---|
| 2007/0118758 A1* | 5/2007 | Takahashi | G06F 21/32 |
| | | | 713/186 |
| 2013/0227664 A1* | 8/2013 | McKay | H04L 9/3231 |
| | | | 726/7 |
| 2016/0094348 A1* | 3/2016 | Takahashi | H04L 9/3247 |
| | | | 713/175 |

OTHER PUBLICATIONS

Jiang, Peng et al., "An anonymous and efficient remote biometrics user authentication scheme in a multi server environment," Frontiers of Computer Science, Springer Berlin Heidelberg, Berlin/Heidelberg, vol. 9, No. 1, Dec. 29, 2014, pp. 142-156.

* cited by examiner

METHOD OF TRANSACTION WITHOUT PHYSICAL SUPPORT OF A SECURITY IDENTIFIER AND WITHOUT TOKEN, SECURED BY THE STRUCTURAL DECOUPLING OF THE PERSONAL AND SERVICE IDENTIFIERS

CROSS-REFERENCE TO RELATED APPLICATIONS

This application is a National Phase Entry of International Patent Application No. PCT/FR2016/050423, filed on Feb. 24, 2016, which claims priority to French Patent Application Serial No. 1551706, filed on Feb. 27, 2015, both of which are incorporated by reference herein.

TECHNICAL FIELD

The present invention relates to the field of electronic transactions using a terminal connected to a server. It relates in particular to the field of electronic payment, electronic commerce and more generally any type of computerised transaction and secure access to a digital or physical resource (for example access control). The security of transactions is essential and has given rise to numerous solutions for limiting the risks of frauds with regard to the author of the transaction or the nature of the transaction.

The solutions most widely used are based on the use of a digital token recorded on a physical medium controlled by the user. This physical medium is for example a memory card, a USB key, a telephone or a tablet containing a memory for recording the token. This solution is generally insufficient since it suffices to steal the physical medium in order to substitute oneself for the authorised user.

Strong authentication solutions have then been proposed. Some combine authentication by token with one or more other authentication means, by "identifier/password" combination, by sending a validation code via a channel separate from the one used for the transaction or by the user of biometric information. Another strong authentication solution relies on the use of a unique token and a unique password-generation algorithm, with a short life, which is synchronised with a customer application installed on the workstation. This algorithm may be installed on a pocket calculator then merely displaying the code generated, on a USB key, which it will be necessary to connect to the apparatus, or on a chip card that transmits the code by contact with a reading apparatus. The password thus generated is valid only for a period of time of 1 to 2 minutes.

There exist also cards based on the principle of the unique token, but without a code to be entered for the user. This code is then transmitted by electromagnetic waves, but requires the establishment of a receiver. Finally, the principle of the token is also applied to printed plastic cards. A serial number appears on these cards and the user discovers their order of entry and the entry of the unique code during the authentication phase. The customer software is responsible for indicating to him the row and column of the figure to be entered for authentication.

More recently, the development of biometric recognition techniques achieved has made it possible to develop strong authentication technologies based on image capture systems coupled to a central database storing the personal information. These technologies use:
fingerprint recognition,
iris recognition,
face recognition, and
voice recognition.

The advantage of these methods is clear: the user always has his "authentication codes" and cannot lose them or forget them.

All these solutions are based on a distinction between "identification" and "authentication". Identification is carried out either by a token containing in its certificate information transmitted to the server, or by the entry of a personal code, of the PIN type. Authentication is carried out by means of a distinct complementary action, intended to validate the first identification information. Optionally, a third certification step is performed by a trusted third party in order to check whether a duly identified and authenticated user is authorised to use a service.

BACKGROUND

In the prior art the international application WO 1998/015924 is known, describing a means and method designed to enable a customer to use a computer system to enter a personal identification number (PIN), one or more biometric registration samples, and one or more of his bank accounts. During an initiation step, the customer initiates access to his account from an automatic teller machine (ATM), a personal computer or any other device for access to a financial file, entering the information relating to his authentication, which comprises a PIN and at least one session-initiation biometric sample. No portable artificial memory device, such as a chip card or a magnetic card, is necessary in this step.

During a transmission step, a message requesting access to the account, comprising the information relating to the authentication of the customer and other data, is sent from the ATM to the computer system. After the computer system has received the information relating to the personal authentication contained in the message requesting access to the account, the information relating the personal authentication is compared with the biometric samples entered, in order to accept or refuse identification of the customer during a customer identification step.

If this identification is accepted, a bank account number of the customer is extracted during an extraction step. The client is finally authorised to access his bank account after his identification has been accepted. With the present invention, a customer may have access to his bank accounts without requiring the use of a token recorded on portable memory devices, for example chip cards or magnetic cards. This solution enables the customers to quickly choose one account among various bank accounts.

The patent WO 2001/027723 is also known, describing a method for authenticating a user by means of a computer platform containing a tested component containing a secure process protected against any physical and logic interference. This method consists of:
for the secure processor, authenticating a biometric reader and authenticating a secure token containing the authentic biometric data of the user;
entering the biometric data of the user by means of a biometric reader, and transferring the biometric data of the user thus entered into the secure processor;
transferring the authentic biometric data of the user into the secure processor;
comparing the authentic biometric data of the user with the entered biometric data of the user;
and, for the secure processor, authenticating the user on the basis of the comparison of these biometric data.

U.S. Pat. No. 6,154,879 describes a method for access, without a biometric token, to the financial accounts in an establishment using an automated teller machine. This method comprises a step of registration of the user, in which a user registers himself with an electronic identifier associated with one or more registrations of biometric samples and one or more user accounts. During an initiation step, the user proceeds with access to the account at an automated teller machine by submitting at least one biometric sample. The electronic identifier associated with the biometric sample in the message requesting access to an account with a biometric registration sample is processed in order to produce either a successful identification or failed identification of the user. With successful identification of the user, at least one financial account of the user is recovered and, in an access step, after a successful identification of the user and the successful recovery of the financial account, the user is authorised to access the financial account of the use.

The international patent application WO 2006/111205 is also known, which relates to a data storage system that makes it possible to protect private life and to guarantee security. This system comprises a plurality of nodes in a network architecture, said nodes being designed to communicate and cooperate in complete security with each other so as to allow storage and extraction of data. A single biometric data item is associated with a blind divided identifier, in a secure fashion, through at least one node, for the storage of data. The data themselves and the link with the original individual, from whom the biometric data are acquired, cannot be obtained without cooperation with at least two nodes. The article "JIANG PENG et al: An anonymous and efficient remote biometrics user authentication scheme in a multi server environment", which appeared in FRONTIERS OF COMPUTER SCIENCE, Springer Berlin Heidelberg, vol. 9, no. 1, 20 Dec. 2014, ISSN:2095-2228, XP035435864, is also known.

Firstly, the solutions of the prior art have failings with regard to the identification and/or authentication protocol. An attacker can perform malevolent operations (the example of the "Yes Card") by passing himself off as the authorised user. Other attacks exist at the server storing the transactional information such as the card number the cryptogram, the identity of the bearer, etc. The solutions of the prior art are generally based on the use of use of a single digital item of information constituting an identifier, associated with other digital information, in particular biometric, for authenticating the identifier. The solutions of the prior art have a major technical problem since they do not allow the storage of biometric data in a form that ensures both their security and their anonymisation.

One of the sources of vulnerability lies in the question of the identifiers. Knowledge of the identifier makes it possible to pass a first step of the procedure for authorisation to a service, the biometric information being used at the following step, which is the authentication of the user who transmitted—licitly or fraudulently—a valid identifier. The security of the identifier depends on the measures taken by the user to keep the character secret, and where applicable the electronic means provided on the physical medium of the identifier when it is recorded on a key, a card or portable equipment such as a telephone.

The solutions of the prior art have a second drawback that relates to the security of the authentic biometric data recorded when an account of a user is created. These data are generally recorded in a secure zone DMZ of the server but, in the case of a computer attack, it remains possible to recover all the biometric data associated with the identifiers of the users. A third drawback lies in the risk of interception of the biometric data and fraudulent reuse of these data. A fourth drawback lies in the risk of the creation of a false account in order to access services of a third-party user.

Moreover, all these solutions of the prior art are based on an identification step using digital information attributed arbitrarily to the user, and verified by a first protocol distinct from the authentication protocol and where applicable from the certification protocol. It is implicitly accepted that identification is vulnerable and requires little computing power on the equipment of the user, since security will come from the robustness of the authentication and optionally certification protocol, requiring more powerful processing resources, made mutual at a server.

SUMMARY

To remedy these drawbacks, the present invention relates, in its most general acceptance, to a secure transaction method without a physical carrier of a security identifier and without a token, consisting of recording, on a biometric server B, a biometric profile $P_i$ linked intrinsically to a single user $U_i$, said profile $P_i$ being associated with at least one service identifier, recorded on a server S distinct from the biometric server B, said service identifier being accessible to the user $U_i$, and, during a transaction, acquiring the biometric profile of a user $P_i$, transmitting it to the biometric server B for comparison with the biometric profiles recorded and seeking and activating on the service server S a service associated with the profile $P_i$, characterised in that the step of recording a new user comprises, at the time of reception of a profile $P_i$ by a central server, the execution of a step of generating a master key, characterised in that said master key is a temporary random key X.

The method according to the invention advantageously comprises:
 a step of generating a reference identifier $IDR_x$ calculated by applying a non-reversible reference cryptographic function FR to said key X, and of recording in a biometric table the unique pair $(P_i, IDR_x)$ recorded on the biometric server B,
 a step of generating a personal identifier $IDP_x$ calculated by applying a non-reversible cryptographic function FP, distinct from the reference function FR, to said random key X and of recording, in an identity table, the pair $(I_i, IDP_x)$ where $I_i$ designates the personal information associated with said profile $P_i$, stored on a server P distinct from the biometric server B, —a step of generating at least one service identifier $IDSE_x$ calculated by applying a non-reversible cryptographic function FSE distinct from the reference functions FR and FP, to said random key X, and of recording, in an identity table, the pair $(SE_j, IDSE_x)$, where $SE_j$ designates the services associated with said profile $P_i$, stored on at least one server S distinct from the biometric server B.

The performance of a transaction preferably comprises:
 at the time of reception by said central server of a profile $P_i$, the execution of a step of seeking the pair $(P_i, IDR_x)$ on the biometric server B and applying the inverse function $FR^{-1}$ to the data item $IDR_x$ in order to determine the key X,
 then the search, if necessary, on the server P for the personal information $I_i$ by applying the function FP to said key X, in order to calculate the identification $IDP_x$ and to obtain the personal information and finally the search for at least one service $SE_j$ on at least one server S by applying the function FSE to said key X, in order to calculate the identifier $IDSE_x$ and to obtain the service $SE_j$.

This invention is particular in that it does not use any "identifier" attributed arbitrarily to the user, but only biometric data intrinsically and irrevocably linked to the user. "Identifier attributed arbitrarily to the user" comprises a number, a surname, a surname/first name pair, a pseudonym, or any other numerical sequence that is attributed without any intrinsic physical relationship with the user.

The invention also relates to a terminal for performing a secure transaction without a physical carrier of a security identifier and without a token according to the aforementioned method, characterised in that said terminal comprises a biometric sensor, a display screen and a microprocessor controlled so as to transmit a biometric profile acquired by the biometric sensor when a transaction is initialised and to display the information coming from the server, relating to at least one accessible service, the terminal further comprising means for entering data intended for the dialogue with said service.

The invention also relates to a computer program for controlling the execution on a computer terminal of a secure transaction without a physical carrier of a security identifier and without a token according to the aforementioned method, characterised in that it consists of a code controlling the acquisition of a biometric profile by the biometric sensor of said terminal and transmission thereof to a central server, as well as the display of the information coming from said central server, relating to at least one accessible service and the protocol for exchange of data between the terminal and the server for use of said service.

The invention also relates to a set of servers for performing secure transactions without a physical carrier of a security identifier and without a token, characterised in that said set of servers comprises load-distribution servers, an input server for receiving the information flows coming from the terminals of the users, servers for executing and finalizing the transactions in accordance with the aforementioned method, servers providing the interface with the computer equipment of trusted third parties making it possible to gain access to a biometric server B and to at least one service server S, and a key server forming the carrier for said non-reversible functions. Preferably, this set of servers for performing secure transactions further comprises processing servers for carrying out processing operations on checking, security and verisimilitude of the information coming from the equipment of the users.

The invention also relates to a computer program for controlling the execution on a computer server of the performance of a secure transaction without a physical carrier of a security identifier and without a token, characterised in that it consists of a code controlling the acquisition of a biometric profile coming from remote equipment, the processing of said biometric profiles in accordance with the aforementioned method and the execution of the protocol for data exchange between the terminal and the server for use of same.

BRIEF DESCRIPTION OF THE DRAWINGS

The present invention will be understood better from a reading of the following description, referring to the accompanying drawings, where.

We also describe the detailed protocols for creating identifiers and for identification as well as the functionalities of the biometric terminal.

DETAILED DESCRIPTION

Hardware Architecture of the Invention

Figure 1:
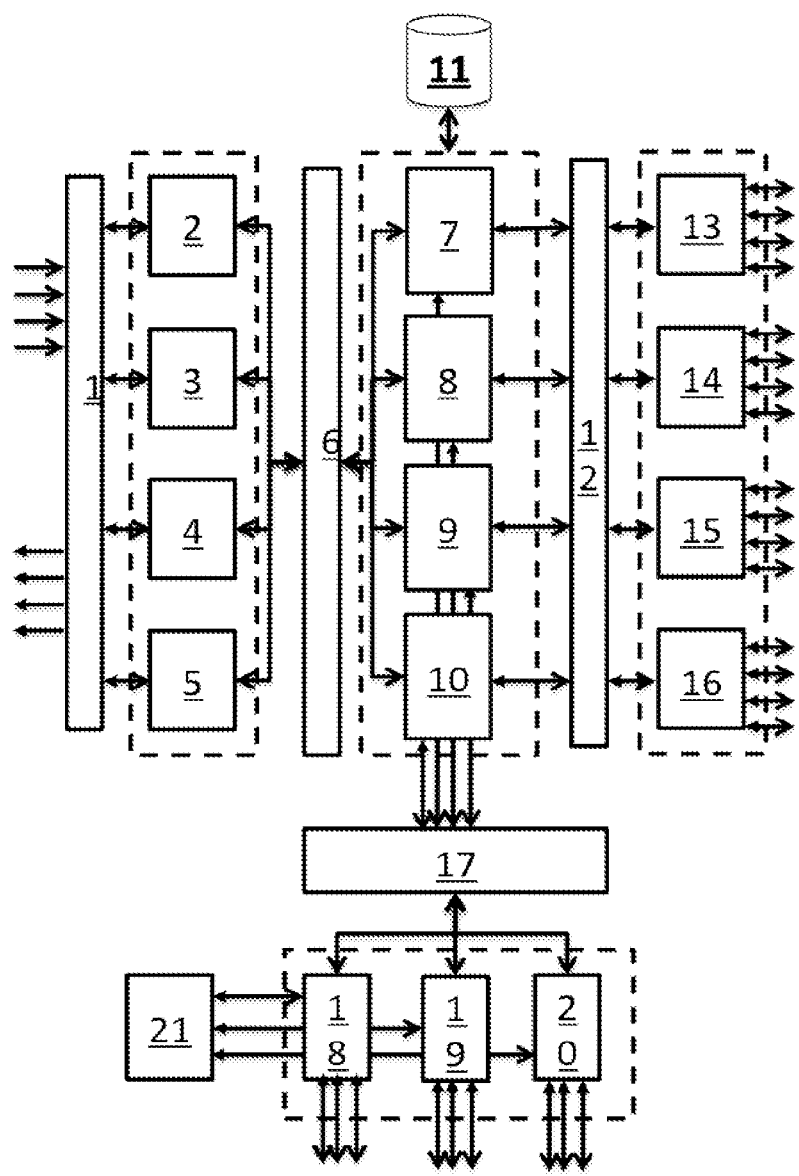
FIG. 1 shows the hardware architecture of a server for implementing the invention.

FIG. 1 shows an outline diagram of the hardware architecture of a system for implementing the invention. The system comprises load-distribution servers (1, 6, 12 and 17).

The input and output server (1) receives the information flows coming from the equipment of the users, manages the queues, for distribution on the fly on processing servers (2 to 5), and returns to the biometric terminals. These processing servers (2 to 5) perform for example processing operations for checking, security and verisimilitude and for transmission in order to check that the information transmitted is indeed of a biometric nature. It is a case in particular of checking whether the identifier of the terminal (for example its IP address) appears on a terminal recorded on a black list, or if the information has anomalies representing attempts at attacks, saturation or frauds.

The server (6) distributes the load of the information validated and pre-processed by the servers (2 to 5) in order to distribute it to a plurality of servers (7 to 10). These servers (7 to 10) execute the transaction in accordance with the invention described below in more detail. In particular, these servers (7 to 10) open a transaction session in order to interact with the server (17) giving access to the servers (18 to 20) in order to obtain the biometric profiles, services and personal information and retrospectively act with the servers (2 to 5) in order to exchange with the user to which a transaction session relates and with the load distributer (12) in order, via the servers (13 to 16), to finalise the transaction in synchronous or asynchronous mode.

The servers (18 to 20) for their part provide the interface with the trusted third-party computer equipment and manage consolidated access to the biometric profiles, personal information and services, by interacting with a key server (21) forming the carrier for the non-reversible functions used by the method according to the invention. The load distributer (17) provides access to the servers (18 to 20) in order to access the biometric profiles, services and personal information. The load distributor (12) provides access to the servers (13 to 16) in order to execute the transactions in synchronous or asynchronous mode. The database (11) stores the trace of all the transactions to allow auditing of the transactions and, in the event of a physical crash, restoration of the transactions.

Functional Diagram of the Invention

Figure 2:
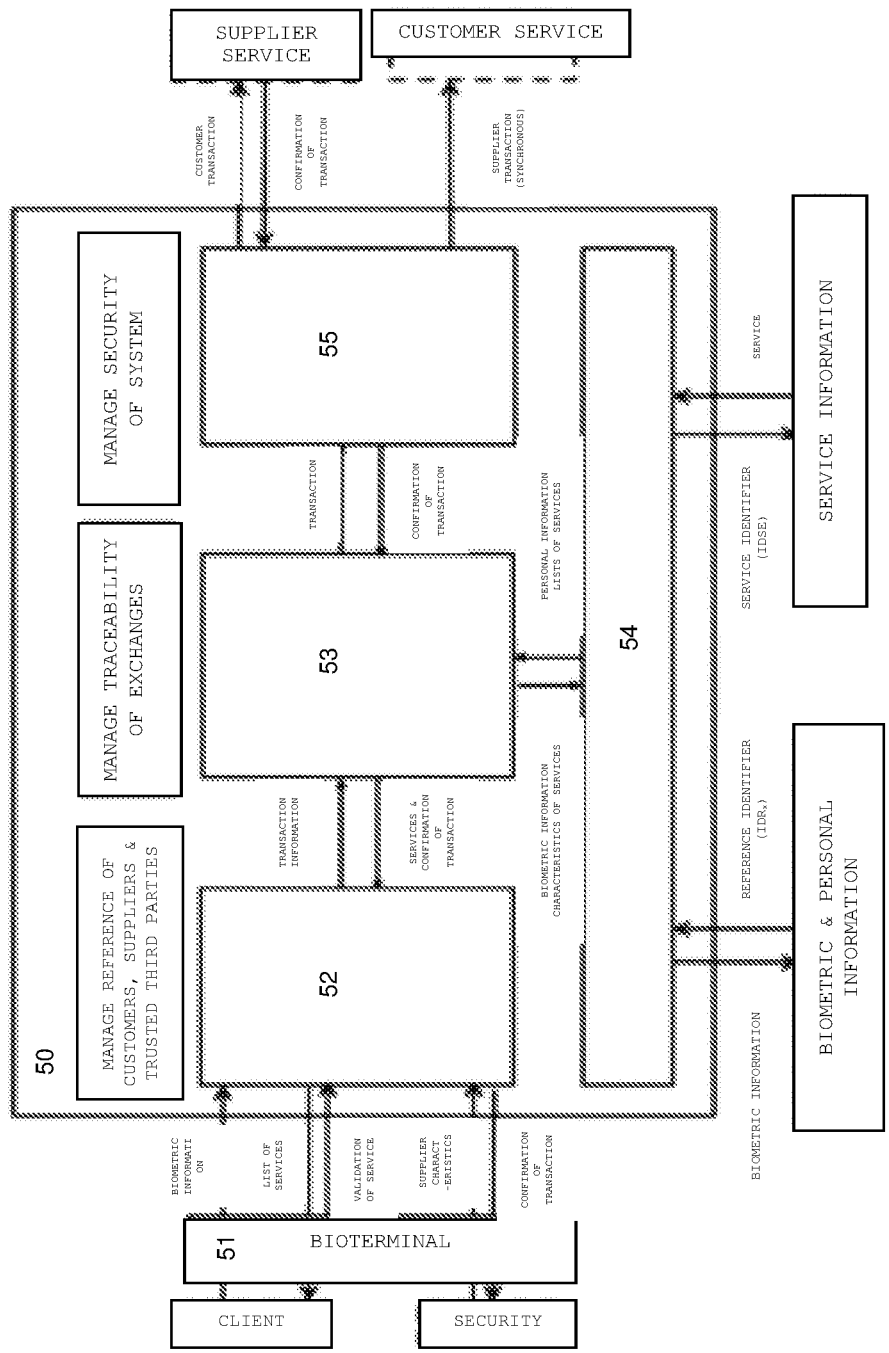
FIG. 2 shows the functional diagram of the invention.

FIG. 2 shows an example of a functional diagram. The client accesses the service by means of computer equipment (51) that comprises a biometric sensor, for example a fingerprint sensor, an iris sensor, a face recognition sensor or a voice sensor. This equipment (51) is connected to a network in order to open a session with the system (50) that hosts all the servers constituting the hardware architecture of the invention.

The first function (52) consists of recovering, checking and transmitting the information necessary for the transaction, in particular the biometric profile acquired by the terminal (51) as well as associated information (for example the geolocation of the terminal, the identifiers of the terminal (IP address, various identifiers such a SIM card), timestamping, and information on the nature of the transaction. This information comes either from the identifier of the supplier/ terminal pair, for example when it is a case of a terminal of a supplier made available to the users, or by the identification of the service access page.

In the case where the terminal (51) is made available to the customer by a supplier, for example in a physical shop where the two parties to the transaction are present face to face, the supplier commences with a step of initialisation of his terminal. This initialisation step is managed by the same identification protocol as the one concerning the identification of the customer. It consists of entering the biometric profile of the supplier, proceeding with a processing operation described below, and recording on the terminal (51) an identifier of the service or of the supplier recognised by this processing. This processing (52) is carried out by the servers (2 to 5) via the load distributor (1).

The following function (53) consists of controlling the processing chains corresponding to the transaction sessions opened for each user. To this end, each transaction session consists of transmitting, checking and reconciling the biometric data, the personal information where applicable and the services provided by the function (54), and then propagating the results to the terminal (51) then obtaining the service selected by the customer and the agreement to the transaction and the validation of the service managed by the function (52). This processing operation (53) is performed by the servers (7 to 10) via the load distributor (6), interacting with servers (18 to 20) and (2 to 5). The processing operation (54) for its part is specifically performed by the servers (18 to 20) via the load distributor (17).

The transaction next involves a processing operation (55) of orchestration, checking and order placing synchronously or asynchronously to the customer and supply services, and then the sending of a transaction confirmation to the customer and supplier, performed by the function (52). This processing operation (55) is performed by the servers (13 to 16) via the load distributor (12). The system (50) also includes functions of managing customers, suppliers and trusted third parties as well as the functions of traceability and the security protocols.

Protocols for Creation of Identifiers and for Identification

The following description presents in more detail the protocol for creating identifiers, and then in the following part the protocol for identification using a biometric profile presented to the system. One of the important aims of the invention is to guarantee security of the data integrated natively in its architecture (by design) because the reference identifier of the biometric profile and the reference identifiers of the services are structurally different, their generation being managed by an algorithm based on a single-direction cryptographic function so as to be able to make connections on the fly in accordance with the transaction requirements. The proposed mechanism is based on the use of cryptographic protocols such as RSA with keys of a size greater than 128 bits.

The operator of the service must choose single-direction cryptographic functions F to manage his exchanges with each trusted third party. They will hereinafter be referred to as FR (standing for reference function), FP (standing for access, storage and updating of personal information) and FSE (standing for access, storage and updating of service information). These functions will enable the servers (18 to 21) to calculate in real time values $Y=F(KQ,X)$ as a function of a value X and using a public key KQ so that the knowledge of Y does not make it possible to go back to X in an algorithmically realistic fashion (the times taken for reconstructing the source value having to be prohibitive in practice). To go back to X, it must be necessary to have a private key KV kept secret, which makes it possible to reconstruct $X=FR^{-1}(KV,Y)$ from Y using a deciphering function $FR^{-1}$.

The reference identifiers, personal identifiers and service identifiers of a user $U_i$ will then be generated in accordance with the following protocol:

The servers (18 to 20) draw at chance a random value X for example using a hash function in order to statistically avoid collisions.

The servers (18 to 20) interact with the server (21) in order to obtain the public keys KR, KP and KSE so as to manage respectively exchanges with the trusted third parties managing the biometric information, the personal information and the services.

The servers (18 to 20) manufacture the reference identifier IDR, the personal identifier IDP and the service identifier IDSE in accordance with the following simple rules (in the event of collision with an existing identifier, a new value X will be generated):

IDR=FR(KR, X)
IDP=FP(KP, X)
IDSE=FSE(KSE, X).

In this way, the identifiers are indeed linked through X, which makes it possible to reconstitute an identifier from the reference identifier using the private cryptographic key that allows deciphering of the reference identifier and therefore makes it possible to reconstitute the random value X from knowledge thereof. The customer services belonging to a give physical person, recognised by means of his biometric profile, will therefore be able to be thus reconstituted.

Functionalities of the Biometric Terminal

The terminal (51) implements relatively simple functionalities in nominal operation:
  Entering/transmitting biodata
  Entering/displaying/storing/modifying
  Transmitting the supplier characteristics (also used in initialisation phase where the user is a supplier)
  Receiving/displaying/transmitting lists of services
  Receiving/displaying an acknowledgement of a transaction.

The terminal must also implement more elaborate functions in order to deal with the case of transactions without a connection:
  Entering/leaving connectionless mode
  Receiving/updating an emergency key
  Checking the validity of the emergency key.

The invention claimed is:

1. A secure transaction method without a physical carrier of a security identifier and without a token, comprising:
  recording, on a biometric server B, biometric profiles comprising a biometric profile $P_i$ linked intrinsically to a single user $U_i$, the biometric profile $P_i$ being associated with at least one service identifier, recorded on a service server S distinct from the biometric server B, the service identifier being accessible to the single user $U_i$;
  during a transaction, acquiring the biometric profile $P_j$ of the single user $U_i$ transmitting biometric profile $P_i$ to the biometric server B for comparison with the biometric profiles and seeking and activating on the service server S a service associated with the biometric profile $P_i$;
  generating a master key when the biometric profile $P_i$ is received by a central server, the master key being a temporary random key X;
  generating a reference identifier $IDR_x$ calculated by applying a non-reversible reference cryptographic function FR to the temporary random key X, and recording in a biometric table a unique pair ($P_i$, $IDR_x$) recorded on the biometric server B;

generating a personal identifier $IDP_X$ calculated by applying a non-reversible cryptographic reference function FP, distinct from the reference function FR, to the temporary random key X and of recording, in an identity table, a pair ($l_i$, $IDP_X$) where $l_i$, designates personal information associated with the profile $P_i$ stored on a server P distinct from the biometric server B;

generating at least one service identifier $IDSE_X$ calculated by applying a non-reversible cryptographic function FSE, distinct from the reference function FR and the reference function FP, to the temporary random key X and of recording, in the identity table, a pair ($SE_i$, $IDSE_X$), where $SE_i$, designates the service associated with the profile $P_i$ stored on the service server S;

upon reception of the profile $P_i$ seeking, by the central server, the unique pair ($P_i$, $IDR_X$) on the biometric server B and applying an inverse function $FR^{-1}$ to the reference identifier $IDR_X$ to determine the temporary random key X;

searching, by the central server, for the personal information $l_i$ on the server P by applying the reference function FP to the temporary random key X, to calculate the personal identifier $IDP_X$ and to obtain the personal information $l_i$; and searching, by the central server, for at least one service $SE_i$, on the service server S by applying the function FSE to the temporary random key X, to calculate the service identifier $IDSE_X$ and to obtain the service $SE_i$.

2. A system for performing secure transaction without a physical carrier of a security identifier and without a token comprising:

a biometric server B programmed to record a biometric profile $P_i$, linked intrinsically to a single user $U_i$ the biometric profile $P_i$, being associated with at least one service identifier;

a service server S, distinct from the biometric server B, programmed to record the service identifier being accessible to the user $U_i$;

a terminal, during a transaction, programmed to acquire the biometric profile $P_i$, of the single user $U_i$ transmitting biometric profile $P_i$, to the biometric server B;

the biometric server B, further programmed to compare the biometric profile $P_i$, with the biometric profiles recorded and seeking and activating on the service server S a service associated with the profile $P_i$; and a central server programmed to generate a master key when the biometric profile $P_i$ is received, the master key being a temporary random key X;

the biometric server B, further programmed to record in a biometric table a unique pair ($P_i$, $IDR_x$), the unique pair ($P_i$, $IDR_x$) comprising a reference identifier $IDR_X$ calculated by applying a non-reversible reference cryptographic function FR to said temporary random key X a server P, distinct from the biometric server B, programmed to store personal information $l_i$, associated with the profile $P_i$;

an identity table programmed to store a pair ($l_i$, $IDP_X$) comprising a personal identifier $IDP_X$ calculated by applying a non-reversible cryptographic reference function FP, distinct from the reference function FR, to the random key X;

the identity table, further programmed to store a pair ($SE_j$, $IDSE_X$), where $SE_j$, designates the service associated with the profile $P_i$, stored on the service server S and where a service identifier $IDSE_X$ is calculated by applying a non-reversible cryptographic function FSE, distinct from the reference function FR and the reference function FP, to the random key X;

the central server, when the profile Pi is received, further programmed to seek the unique pair ($P_i$, $IDR_x$) on the biometric server B and applying an inverse function $FR^{-1}$ to the reference identifier $IDR_X$ to determine the key X;

the central server, further programmed to search on server P for the personal information $l_i$ by applying the reference function FP to the key X to calculate the personal identifier $IDP_X$ and to obtain the personal information $l_i$; and the central server, further programmed to search on the server S for at least one service $SE_j$, by applying the function FSE to the key X, to calculate the service identifier $IDSE_X$ to obtain the service $SE_j$.

* * * * *